US012608162B2

(12) United States Patent
Bessho

(10) Patent No.: US 12,608,162 B2
(45) Date of Patent: Apr. 21, 2026

(54) STORAGE DEVICE, ELECTRONIC APPARATUS, AND METHOD FOR CONTROLLING STORAGE DEVICE

(71) Applicant: SONY SEMICONDUCTOR SOLUTIONS CORPORATION, Kanagawa (JP)

(72) Inventor: Kazuhiro Bessho, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/842,542

(22) PCT Filed: Feb. 24, 2023

(86) PCT No.: PCT/JP2023/006648
§ 371 (c)(1),
(2) Date: Aug. 29, 2024

(87) PCT Pub. No.: WO2023/171402
PCT Pub. Date: Sep. 14, 2023

(65) Prior Publication Data
US 2025/0165188 A1 May 22, 2025

(30) Foreign Application Priority Data
Mar. 8, 2022 (JP) ................................ 2022-035359

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ...... G06F 12/06; G06F 3/0619; G06F 3/0659; G06F 3/0679
See application file for complete search history.

(56) References Cited

U.S. PATENT DOCUMENTS

| | | | | |
|---|---|---|---|---|
| 10,249,814 B1* | 4/2019 | Park | ...................... | G11C 11/161 |
| 2004/0104724 A1* | 6/2004 | Sato | ..................... | G01R 33/091 |
| | | | | 324/225 |
| 2021/0293987 A1* | 9/2021 | Chiba | .................... | G01R 33/02 |

FOREIGN PATENT DOCUMENTS

| | | |
|---|---|---|
| CN | 112581995 A | 3/2021 |
| JP | 2004-303382 A | 10/2004 |
| JP | 5046189 B2 | 10/2012 |
| JP | 2014-112691 A | 6/2014 |

(Continued)

OTHER PUBLICATIONS

International Search Report and Written Opinion of PCT Application No. PCT/JP2023/006648, issued on Mar. 28, 2023, 11 pages of ISRWO.

*Primary Examiner* — Yong J Choe
(74) *Attorney, Agent, or Firm* — CHIP LAW GROUP

(57) ABSTRACT

A storage device includes a first memory that allows reading and writing of data, a second memory that allows reading and writing of data, a detection unit that detects a magnetic field intensity in the periphery of the first memory, and a control unit that saves data from the first memory to the second memory and switches a memory in use from the first memory to the second memory depending on the magnetic field intensity detected by the detection unit.

16 Claims, 9 Drawing Sheets

(56) References Cited

FOREIGN PATENT DOCUMENTS

| JP | 2017-054249 | A | 3/2017 |
|----|-------------|---|--------|
| JP | 2020-042890 | A | 3/2020 |

* cited by examiner

10

TEMPERATURE T

<IN SPACE OR ASTEROID>

<DISASTER AND ACCIDENT SITES>

1

STORAGE DEVICE, ELECTRONIC APPARATUS, AND METHOD FOR CONTROLLING STORAGE DEVICE

CROSS REFERENCE TO RELATED APPLICATIONS

This application is a U.S. National Phase of International Patent Application No. PCT/JP2023/006648 filed on Feb. 24, 2023, which claims priority benefit of Japanese Patent Application No. JP 2022-035359 filed in the Japan Patent Office on Mar. 8, 2022. Each of the above-referenced applications is hereby incorporated herein by reference in its entirety.

FIELD

The present disclosure relates to a storage device, an electronic apparatus, and a method for controlling a storage device.

BACKGROUND

Along with the rapid development of various information apparatuses from large-capacity servers to mobile terminals, there has been a demand for further improvement in performance such as higher integration, higher speed, and lower power consumption in constituent elements thereof such as memories and logics. In particular, advancement of non-volatile semiconductor memories is remarkable, and for example, a flash memory as a large-capacity file memory has been widely spread at a speed of expelling a hard disk drive. On the other hand, considering the use for code storage and application to working memories, various types of semiconductor memories, such as a ferroelectric random access memory (FeRAM), a magnetic random access memory (MRAM), and a phase-change random access memory (PCRAM), have been developed in order to replace general NOR flash memory, dynamic random access memory (DRAM), and the like which are currently used. Note that some of them have already been put to practical use.

The MRAM, which is one of the above-described semiconductor memories, stores information by utilizing a change of electrical resistance caused by changing a magnetization state (reversing a magnetization direction) of a magnetic substance of a magnetic storage element included in the MRAM. Therefore, the stored information can be read by determining a resistance state of the magnetic storage element set by the change in the magnetization state, specifically, a magnitude of the electrical resistance of the magnetic storage element. Such an MRAM is capable of high-speed operation, can be rewritten almost infinitely ($10^{15}$ times or more), and has high reliability, and thus, is already used in fields such as industrial automation and aircraft. Further, the MRAM is expected to be extended to the code storage and the working memories in the future because of its high-speed operation and high reliability.

Among the MRAMs as described above, an MRAM that reverses magnetization of a magnetic substance using spin torque magnetization reversal has the above-described advantages such as the high-speed operation, and can also achieve low power consumption and large capacity, and thus, has greater expectations. Note that such an MRAM using the spin torque magnetization reversal is called a spin transfer torque-magnetic random access memory (STT-MRAM). The STT-MRAM includes, as a magnetic storage element, a magnetic tunnel junction (MTJ) element having two magnetic layers (storage layer and fixed layer) and an insulating layer (for example, MgO) sandwiched between the magnetic layers. Note that the MTJ element is also referred to as a tunneling magneto resistive (TMR) element.

The stability of information recorded in the MRAM is called a retention characteristic. The retention characteristic is expressed by lowness of a probability that the "0" state transitions to the "1" state or the opposite state thereof by exceeding an energy barrier due to external disturbance against an intention of a user. This probability is called a retention error rate. A first external environmental factor is temperature, and since thermal energy represented by a product of temperature and the Boltzmann constant increases at high temperature, an effective energy barrier is lowered, the probability of the state transition increases, and the stability decreases. A second factor is an external magnetic field. Considering a case where the external magnetic field is applied in parallel with a direction in which the magnetization is stable, there is a difference in potential energy sensed by the magnetization depending on an orientation direction of the magnetic field, and thus, the stability of either "0" or "1" decreases. That is, the influence thereof is asymmetric with respect to data. Further, the external magnetic field also affects a writing characteristic. Writing of the STT-MRAM is merely a process of causing a transition from the "0" state to the "1" state or vice versa by exceeding the energy barrier described above. Due to the asymmetric influence of the external magnetic field, writing of either zero or one becomes easy, whereas writing of the other becomes difficult. In other words, for data of either zero or one, a probability that writing fails with respect to a program voltage, that is, a writing error rate increases. Further, regarding influences of the first and second factors, that is, both the temperature and the external magnetic field, it is generally known that a higher temperature affects the operation with a lower magnetic field.

As described above, the external magnetic field causes an increase in both a retention error and a writing error. When such errors occur, there is a high risk that a serious failure occurs due to data loss or malfunction in a system that operates on the basis of an instruction code or data stored in the MRAM. Further, an environment in which an information processing apparatus equipped with a memory is placed is also diversified, and regarding the external magnetic field, there are various generation sources in both an intensity and a frequency, such as a driving device such as a fixing magnet or a motor, and an electromagnetic induction type contactless power supply. Therefore, it is necessary to sufficiently reduce the writing and retention errors even under these external magnetic fields, but there is a limit to enhancing the energy barrier by improving characteristics of a material forming the MRAM. Thus, Patent Literature 1 proposes a method of shielding the MRAM from the above-described magnetic fields by providing a magnetic shield structure. Further, Patent Literature 2 proposes a method of avoiding a writing error by sensing a magnetic field and stopping the operation.

CITATION LIST

Patent Literature

Patent Literature 1: Japanese Patent Application Laid-open No. 2014-112691
Patent Literature 2: Japanese Patent No. 5046189

SUMMARY

Technical Problem

However, in the method of Patent Literature 1, a shielding effect obtained by a magnetic shield is also limited, and there is a risk that a system error occurs due to data loss or malfunction when it is exposed to an external magnetic field more than expected. Further, in the method of Patent Literature 2, even if the writing error can be avoided, a system operation stop period occurs due to the occurrence of a processing operation stop period.

Therefore, the present disclosure provides a storage device, an electronic apparatus, and a method for controlling a storage device which enable avoidance of a system failure caused by a memory error derived from an external magnetic field.

Solution to Problem

A storage device according to an aspect of the present disclosure includes: a first memory that allows reading and writing of data; a second memory that allows reading and writing of data; a detection unit that detects a magnetic field intensity in a periphery of the first memory; and a control unit that saves data from the first memory to the second memory and switches a memory in use from the first memory to the second memory depending on the magnetic field intensity detected by the detection unit.

An electronic apparatus according to an aspect of the present disclosure includes: a storage device that stores data, wherein the storage device includes: a first memory that allows reading and writing of data; a second memory that allows reading and writing of data; a detection unit that detects a magnetic field intensity in a periphery of the first memory; and a control unit that saves data from the first memory to the second memory and switches a memory in use from the first memory to the second memory depending on the magnetic field intensity detected by the detection unit.

A method for controlling a storage device, the method according to an aspect of the present disclosure includes: detecting a magnetic field intensity in a periphery of a first memory that allows reading and writing of data; and saving data from the first memory to a second memory that allows reading and writing of data and switching a memory in use from the first memory to the second memory depending on the detected magnetic field intensity.

DESCRIPTION OF EMBODIMENTS

Figure 1:
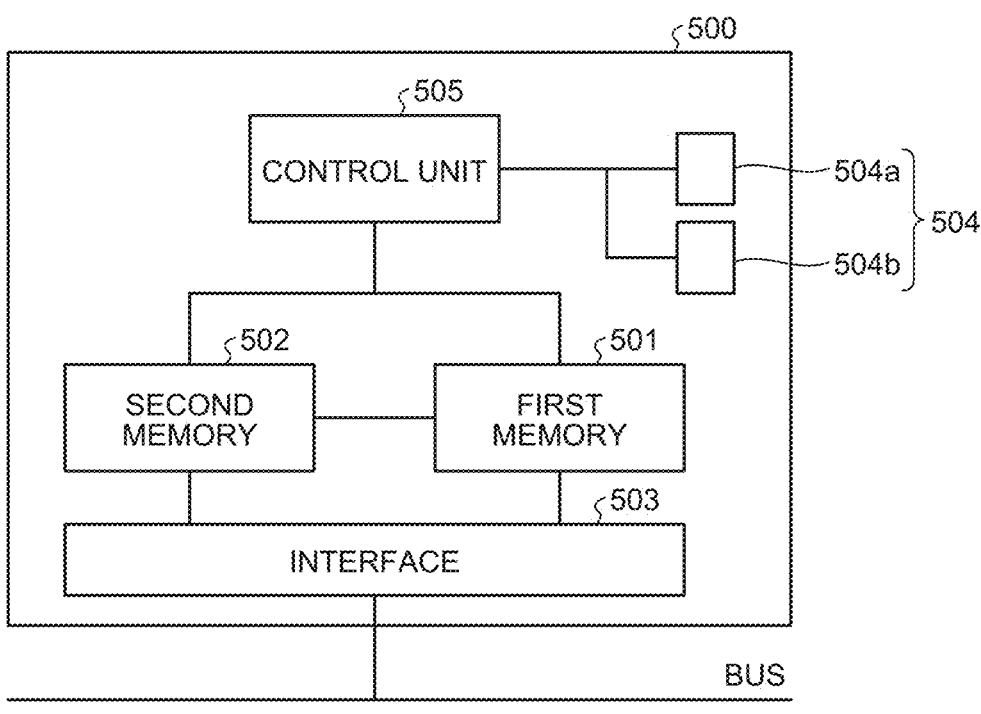
FIG. 1 is a diagram illustrating an example of a schematic configuration of a storage device according to a first embodiment.

Hereinafter, embodiments of the present disclosure will be described in detail with reference to the drawings. Note that a device, an apparatus, a method, and the like according to the present disclosure are not limited by the embodiments. Further, the same portions are basically denoted by the same reference signs in each of the following embodiments, and a repetitive description thereof will be omitted.

One or a plurality of embodiments (including examples and modifications) to be described hereinafter can be implemented independently. Meanwhile, at least some of the plurality of embodiments to be described hereinafter may be implemented appropriately in combination with at least some of other embodiments. The plurality of embodiments may include novel features different from each other. Therefore, the plurality of embodiments can contribute to achieving mutually different objects or solutions to problems, and can exhibit mutually different effects. Note that the effects of the respective embodiments are merely examples and are not limited, and additional effects may be present.

Further, the drawings referred to in the following description are drawings for facilitating the description and understanding of an embodiment of the present disclosure, and shapes, dimensions, ratios, and the like illustrated in the drawings are sometimes different from actual ones for the sake of clarity. Furthermore, an element and the like illustrated in the drawings can be appropriately modified in design in consideration of the following description and known techniques. Further, in the following description, a vertical direction of a laminate structure of the element and the like corresponds to a relative direction in a case where a surface of a substrate on which the element is provided is facing upward, and is sometimes different from the vertical direction according to actual gravitational acceleration.

Further, in the following description, terms such as "perpendicular direction" (a direction perpendicular to a film surface or a laminating direction of the laminate structure) and "in-plane direction" (a direction parallel to the film surface or a direction perpendicular to the laminating direction of the laminate structure) are used for convenience when the description regarding a magnetization direction (magnetic moment) or magnetic anisotropy is given. However, these terms do not necessarily mean the exact directions of magnetization. For example, an expression such as "the magnetization direction is the perpendicular direction" or "having perpendicular magnetic anisotropy" means a state where magnetization in the perpendicular direction is superior to magnetization in the in-plane direction. Similarly, for example, an expression such as "the magnetization direction is the in-plane direction" or "having in-plane magnetic anisotropy" means a state where magnetization in the in-plane direction is superior to magnetization in the perpendicular direction.

The present disclosure will be described in the following item order.

1. First Embodiment
1-1. Configuration Example of Storage Device
1-2. Configuration Example of MRAM
1-3. Configuration Example of MTJ Element
1-4. Writing and Reading of MTJ Element
1-5. In-Plane Magnetization STT-MRAM and Perpendicular Magnetization STT-MRAM
1-6. First Operation Example of Storage Device
1-7. Second Operation Example of Storage Device
1-8. Action and Effect
2. Second Embodiment
2-1. Configuration Example of Storage Device
2-2. Action and Effect
3. Other Embodiments
4. Application Example
4-1. Imaging Device
4-2. Exploration Robot
4-3. Investigation Robot
4-4. Automobile
5. Appendix

1. First Embodiment

1-1. Configuration Example of Storage Device

A configuration example of a storage device 500 according to a first embodiment will be described with reference to FIG. 1. FIG. 1 is a diagram illustrating an example of a schematic configuration of the storage device 500 according to the first embodiment.

As illustrated in FIG. 1, the storage device 500 according to the first embodiment includes a first memory 501, a second memory 502, an interface 503, a detection unit 504, and a control unit (controller) 505. The storage device 500 is incorporated and used in various systems.

The first memory 501 is a memory that allows reading and writing of data, and is a main memory mainly referred to by a system. The first memory 501 is connected to a bus through the interface 503, and can exchange information with the outside.

The second memory 502 is a memory that allows reading and writing of data and is a sub-memory for data saving. The second memory 502 is connected to the bus through the interface 503, and can exchange information with the outside, which is similar to the first memory 501.

The interface 503 is an interface for the bus. The interface 503 connects the first memory 501 and the second memory 502 to the bus.

The detection unit 504 includes a magnetic field sensor 504a and a temperature sensor 504b. The magnetic field sensor 504a detects a magnetic field intensity of the periphery of the first memory 501. The temperature sensor 504b detects a temperature of the periphery of the first memory 501. The periphery of the first memory 501 is, for example, a range in which the first memory 501 is affected by a change in the magnetic field or temperature.

The control unit 505 acquires detection information detected by the detection unit 504, that is, the magnetic field intensity detected by the magnetic field sensor 504a and the temperature detected by the temperature sensor 504b, and controls operations of both the first memory 501 and the second memory 502 and controls data movement between the first memory 501 and the second memory 502 on the basis of the magnetic field intensity and the temperature.

Here, for example, an MRAM is used as the first memory 501. Examples of the MRAM include a magnetic field writing MRAM, an STT-MRAM, a spin orbit torque (SOT)-MRAM, and a voltage controlled (VC)-MRAM.

Further, the second memory 502 is a memory having higher magnetic field resistance (resistance to a magnetic field that affects reading and writing of data) than the first memory 501. As the second memory 502, for example, a static random access memory (SRAM), a dynamic random access memory (DRAM), or the like, which is a memory that is not affected by a magnetic field, is used. An influence of a magnetic field is an influence of the magnetic field on reading and writing of data. The SRAM, the DRAM, or the like is a memory that uses electric charge for information recording.

Further, as the second memory 502, for example, other memories that are not affected by the magnetic field, such as an embedded dynamic random access memory (eDRAM), an embedded flash memory (eFlash memory), a ferroelectric random access memory (FeRAM), a resistive random access memory (ReRAM), a phase change memory (PCM), and an electrically erasable programmable read only memory (EEPROM), can be used.

Note that, in a case where the first memory 501 is an MRAM, another MRAM having higher resistance to a magnetic field than the first memory 501 may be used as the second memory 502. In this case, there is an advantage that the first memory 501 and the second memory 502 can be manufactured by the same process. Further, the second memory 502 may be a memory having higher temperature resistance (resistance to a temperature that affects reading and writing of data) than the first memory 501.

1-2. Configuration Example of MRAM

Figure 2:
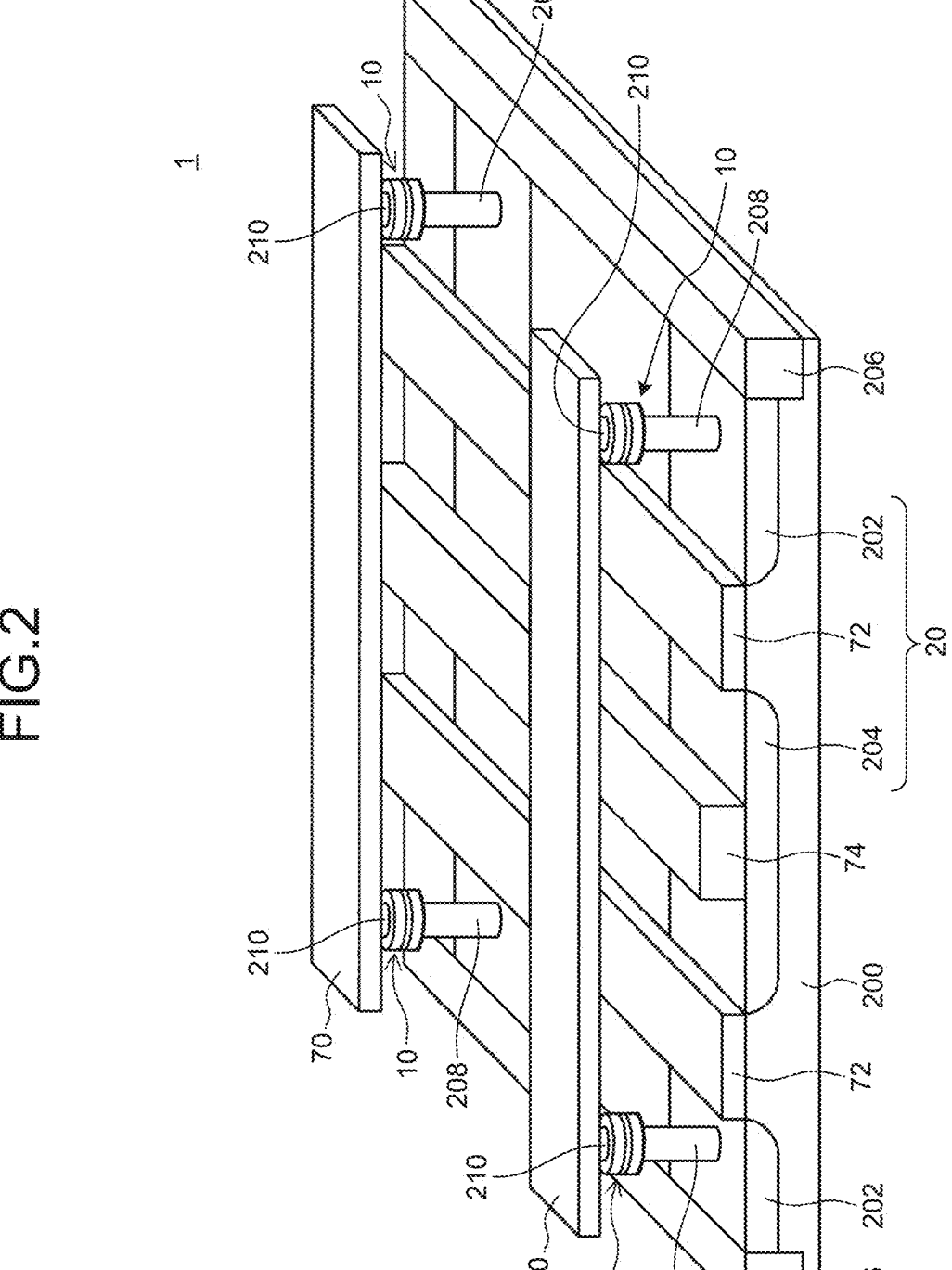
FIG. 2 is a perspective view illustrating an example of a schematic configuration of an MRAM according to the first embodiment.

A configuration example of an MRAM 1 according to the first embodiment will be described with reference to FIG. 2. FIG. 2 is a perspective view illustrating an example of a schematic configuration of the MRAM 1 according to the first embodiment. The MRAM 1 is a memory that retains information in accordance with the magnetization direction of a magnetic substance.

As illustrated in FIG. 2, there are a plurality of MTJ elements 10 in the MRAM 1 according to the first embodiment. The MTJ elements 10 are each arranged in the vicinity of an intersection of two types of address wirings intersecting (orthogonal to) each other, for example, a bit line 70 and a gate electrode (word line) 72, and are provided in a matrix form. The MTJ element 10 has two terminals, one terminal is electrically connected to the bit line 70, and the other terminal is electrically connected to a selection transistor 20. The MTJ element 10 is an example of a storage element, and the matrix form is an example of an array form.

The selection transistor 20 is provided on a semiconductor substrate 200 such as a silicon substrate, and is formed in a region isolated by an element isolation layer 206 provided on the semiconductor substrate 200. The selection transistor 20 is a transistor for selecting the MTJ element 10. The selection transistor 20 includes the gate electrode (word line) 72, a source region 202, and a drain region 204.

Note that a plurality of memory cells are arrayed on the semiconductor substrate 200 in the MRAM 1. In the examples of FIG. 2, one memory cell includes the MTJ element 10 and one selection transistor 20 for selecting this MTJ element 10. Thus, a part corresponding to four memory cells is extracted and illustrated in FIG. 2.

The gate electrode 72 is provided so as to extend in the depth direction in FIG. 2, and also serves as the word line. A wiring 74 is provided on the drain region 204, and the wiring 74 is electrically connected to the drain region 204. The drain region 204 is configured such that its potential can be appropriately changed via the wiring 74. In the examples of FIG. 2, the drain region 204 is formed in common to the selection transistors 20 arranged adjacent to each other.

A contact layer 208 is provided on the source region 202, and the contact layer 208 is electrically connected to the source region 202. The MTJ element 10 is provided on the contact layer 208, and the MTJ element 10 is electrically connected to the contact layer 208. The contact layer 208 electrically connects the source region 202 of the selection transistor 20 and the MTJ element 10. The contact layer 208 is, for example, a contact via and is an example of a through wiring. The contact layer 208 functions as a lower electrode.

A contact layer 210 is provided on the MTJ element 10, and the contact layer 210 is electrically connected to the MTJ element 10. On the contact layer 210, the bit line 70 is provided so as to extend in a direction orthogonal to the gate electrode (word line) 72, and the bit line 70 is electrically connected to the contact layer 210. The contact layer 210 electrically connects the MTJ element 10 and the bit line 70. The contact layer 210 is, for example, a contact via and is an example of a through wiring. The contact layer 210 functions as an upper electrode.

The MRAM 1 is provided with a power supply circuit (not illustrated) capable of applying a desired current to the gate electrode (word line) 72 and the bit line 70. The power supply circuit is controlled by a control unit 505. At the time of writing information, the power supply circuit applies a voltage to an address wiring corresponding to a desired memory cell to which writing is to be performed, that is, the gate electrode (word line) 72 and the bit line 70, and causes a current to flow through the MTJ element 10. Note that, in the MTJ element 10, it is possible to write information of 1 or 0 by reversing a magnetic moment of a predetermined layer (a storage layer 106 to be described later) by spin torque magnetization reversal (to be described later in detail).

On the other hand, at the time of reading information, the MRAM 1 causes the power supply circuit to apply a voltage to the gate electrode (word line) 72 corresponding to a desired memory cell from which reading is to be performed, and detects a current flowing from the bit line 70 through the MTJ element 10 to the selection transistor 20. An electrical resistance of the MTJ element 10 changes depending on a direction of the magnetic moment in the predetermined layer (the storage layer 106 to be described later) of the MTJ element 10 due to the tunneling magnetoresistance (TMR) effect, the information of I/O can be read on the basis of a magnitude of a detected current value. At this time, since the current at the time of reading is much smaller than the current flowing at the time of writing, a magnetic direction in the predetermined layer of the MTJ element 10 does not change at the time of reading. That is, the MTJ element 10 can read information in a non-destructive manner.

1-3. Configuration Example of MTJ Element

Figure 3:
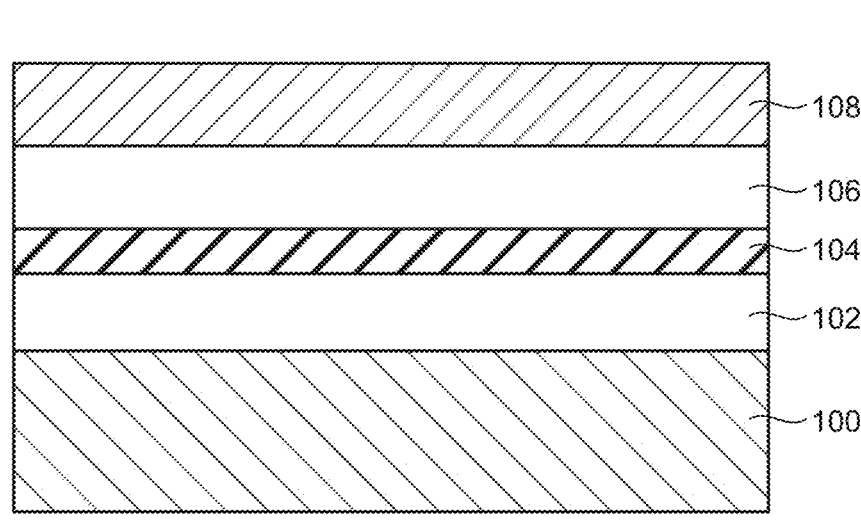
FIG. 3 is a cross-sectional view illustrating an example of a schematic configuration of an MTJ element according to the first embodiment.

A configuration example (basic structure) of the MTJ element 10 according to the first embodiment, for example, the MTJ element 10 of an STT-MRAM using spin torque magnetization reversal will be described with reference to FIG. 3. FIG. 3 is a cross-sectional view illustrating an example of a schematic configuration of the MTJ element

10. The MTJ element 10 is a magnetic storage element that stores one piece of information (I/O).

As illustrated in FIG. 3, the MTJ element 10 includes a base layer 100, a fixed layer 102, an insulating layer 104, the storage layer 106, and a cap layer 108. The base layer 100, the fixed layer 102, the insulating layer 104, the storage layer 106, and the cap layer 108 are laminated in the described order. The insulating layer 104 corresponds to a tunnel insulating layer (tunnel barrier layer).

The MTJ element 10 defines "0" and "1" of information by a relative angle between magnetization of the fixed layer 102 and magnetization of the storage layer 106. For example, the MTJ element 10 constitutes a perpendicular magnetization STT-MRAM. That is, a magnetization direction of a magnetic layer (the fixed layer 102 and the storage layer 106) included in a laminate structure of the MTJ element 10 is the direction perpendicular to the film surface (layer surface), in other words, the laminating direction of the laminate structure.

Although not illustrated in the example of FIG. 3, the MTJ element 10 is sandwiched between the upper electrode and the lower electrode (the respective contact layers 210 and 208). In the MTJ element 10, a voltage is applied between the lower electrode and the upper electrode of the MTJ element 10 via the gate electrode (word line) 72 and the bit line 70, and information is written to and read from the storage layer 106 of the MTJ element 10.

Note that the description is given assuming that, in the MTJ element 10, a magnetization direction of the storage layer 106 is reversed by the spin torque magnetization reversal, but a magnetization direction of the fixed layer 102 is not reversed, that is, the magnetization direction is fixed. Further, it is assumed that the insulating layer 104 is sandwiched between the fixed layer 102 and the storage layer 106.

The base layer 100 is provided on the semiconductor substrate 200 via the lower electrode (for example, the contact layer 208). For example, the base layer 100 is configured using a film for controlling a crystal orientation of the fixed layer 102 and improving an adhesion strength to the lower electrode.

The fixed layer 102 is a layer (magnetization-fixed layer) whose magnetization direction is fixed. The fixed layer 102 is formed using a ferromagnetic substance having a magnetic moment whose magnetization direction is fixed in the perpendicular direction, and a direction of the magnetic moment is fixed by a high coercive force or the like. The fixed layer 102 is formed in, for example, a laminated ferri-pinned structure including at least two ferromagnetic layers and a non-magnetic layer.

The insulating layer 104 is formed using various non-magnetic substances and the like, and is provided to be sandwiched between the fixed layer 102 and the storage layer 106. The insulating layer 104 is a layer formed using an insulating material such as MgO. In addition to the above-described materials, the insulating layer 104 can also be configured using, for example, various insulators, dielectrics, and semiconductors such as $Al_2O_3$, AlN, $SiO_2$, $Bi_2O_3$, $MgF_2$, CaF, $SrTiO_2$, $AlLaO_3$, and Al—N—O.

The storage layer 106 is a layer whose magnetization direction can be changed, for example, reversed. The storage layer 106 is formed using a ferromagnetic substance having a magnetic moment in which a magnetization direction freely changes in the perpendicular direction, and the direction of the magnetic moment changes in response to information to be stored. The storage layer 106 stores information according to a magnetization state of a magnetic substance, and may be formed of one layer or may have a structure in which a plurality of layers are laminated. The information is stored according to a direction of magnetization of the storage layer 106 having uniaxial anisotropy.

For example, writing is performed by applying a current to the storage layer 106 in the perpendicular direction and causing the spin torque magnetization reversal. That is, when a write current flowing in the laminating direction of the storage layer 106 and the fixed layer 102 is applied, the direction of magnetization of the storage layer 106 changes, and information is stored in the storage layer 106. Note that the fixed layer 102 is provided via the insulating layer 104 of a tunnel barrier film with respect to the storage layer 106 in which the direction of magnetization is reversed by spin injection, and is used as a reference of storage information (magnetization direction) of the storage layer 106.

The cap layer 108 is formed using, for example, various metal materials such as Ta, an alloy material, an oxide material, or the like. The cap layer 108 protects each laminated layer during manufacture of the MTJ element 10. Note that the cap layer 108 may function as a hard mask.

The MTJ element 10 having such a laminate structure is manufactured, for example, by continuously forming the base layer 100 to the cap layer 108 in a vacuum device, and then, forming a pattern of the MTJ element 10 by processing such as etching. The MTJ elements 10 are arranged in the matrix form (see FIG. 2).

Here, for example, Co—Fe—B is used as the storage layer 106 and the fixed layer 102. The magnetization direction of the fixed layer 102 serves as the reference of information, and thus, should not be changed by recording or reading, but is not necessarily fixed in a specific direction. It is sufficient to cause the magnetization to be hardly changed as compared with the storage layer 106 by increasing a coercive force, a thickness, or a magnetic damping constant than that of the storage layer 106.

Further, when the magnetization is fixed, the fixed layer 102 may be indirectly fixed by bringing antiferromagnetic substances such as PtMn and IrMn into contact with the fixed layer 102 or magnetically coupling magnetic substances brought into contact with the antiferromagnetic substances via a non-magnetic substance such as Ru.

Further, in a perpendicular magnetization film in the storage layer 106, a composition is adjusted such that a magnitude of an effective demagnetizing field received by the perpendicular magnetization film is smaller than a saturation magnetization amount Ms. As described above, a Co—Fe—B composition of a ferromagnetic material of the storage layer 106 is selected, and the magnitude of the effective demagnetizing field received by the storage layer 106 is reduced to be smaller than the saturation magnetization amount Ms of the storage layer 106. As a result, the magnetization of the storage layer 106 is oriented in the perpendicular direction.

Further, in a case where the insulating layer 104, which is the tunnel barrier layer, is formed using magnesium oxide (MgO), a magnetoresistance change rate (MR ratio) can be increased. When the MR ratio is increased in this manner, the efficiency of spin injection in the MTJ element 10 can be improved, and the current density necessary for reversing the direction of magnetization of the storage layer 106 can be reduced. Further, in the present embodiment, a material of the insulating layer 104 as an intermediate layer may be replaced with a metal material, and the spin injection may be performed by the giant magnetoresistance (GMR) effect.

According to the configuration of the MTJ element 10 described above, the storage layer 106 is configured such that the magnitude of the effective demagnetizing field received by the storage layer 106 is smaller than the saturation magnetization amount Ms of the storage layer 106. As a result, the demagnetizing field received by the storage layer 106 decreases, and the amount of the write current necessary for reversing the direction of magnetization of the storage layer 106 can be reduced. This is because a reversal current of a perpendicular magnetization type STT-MRAM is applied since the storage layer 106 has perpendicular magnetic anisotropy, which is advantageous in terms of the demagnetizing field. Further, since the amount of the write current can be reduced without reducing the saturation magnetization amount Ms of the storage layer 106, it is possible to secure the thermal stability of the storage layer 106 by setting the saturation magnetization amount Ms of the storage layer 106 to a sufficient amount. As a result, the MTJ element 10 having an excellent characteristic balance can be configured.

Further, since the fixed layer 102 has the laminated ferri-pinned structure, the sensitivity of the fixed layer 102 is reduced with respect to an external magnetic field, a leakage magnetic field caused by the fixed layer 102 is shielded, and the perpendicular magnetic anisotropy of the fixed layer 102 can be enhanced by interlayer coupling of a plurality of magnetic layers. In this manner, the thermal stability as the information retention capability can be sufficiently secured, and thus, the MTJ element 10 having the excellent characteristic balance can be configured. Note that such a method of fixing the magnetization direction of the fixed layer 102 can be used regardless of whether the fixed layer 102 is below or above the storage layer 106.

Here, a structure in which the laminated ferri-pinned structure is provided on the lower side (that is, the base layer 100 side) with respect to the storage layer 106 is also referred to as a bottom-pinned structure, and a structure in which the laminated ferri-pinned structure is provided on the upper side (that is, the cap layer 108 side) with respect to the storage layer 106 is also referred to as a top-pinned structure. That is, the MTJ element 10 may have either the bottom-pinned structure or the top-pinned structure.

Note that, in the example of FIG. 3, a structure in which the insulating layer 104 and the fixed layer 102 are laminated in the downward direction with respect to the storage layer 106 is illustrated as the laminate structure of the MTJ element 10, but the structure of the MTJ element 10 is not particularly limited. For example, another layer may be added to the MTJ element 10, or the MTJ element 10 may be configured by interchanging positions of the fixed layer 102 and the storage layer 106. As an example, the MTJ element 10 may be configured by adding an insulating layer (upper tunnel barrier layer) and a fixed layer (upper magnetization-fixed layer) between the storage layer 106 and the cap layer 108 in the described order. In this case, the fixed layer 102 functions as a lower magnetization-fixed layer, and the insulating layer 104 functions as a lower tunnel barrier layer.

1-4. Writing and Reading of MTJ Element

Mechanisms for information writing and reading of the MTJ element 10 will be described. First, a mechanism for information writing of the MTJ element 10 will be described. In the MTJ element 10, information is written to the storage layer 106 using spin torque magnetization reversal as described above.

Here, details of the spin torque magnetization reversal will be described. Electrons are known to have two types of spin angular momentum. Therefore, the spin angular momentum is defined as two types of spin angular momentum, namely, upward spin angular momentum and downward spin angular momentum. The upward spin angular momentum and the downward spin angular momentum are the same amount inside a non-magnetic substance, but are different in amount inside a ferromagnetic substance.

Furthermore, here, a case is considered in which directions of magnetic moments of the fixed layer 102 and the storage layer 106 are different from each other in an antiparallel state in the MTJ element 10, and in this state, electrons are caused to enter the storage layer 106 from the fixed layer 102.

When the electrons pass through the fixed layer 102, spin polarization occurs, that is, a difference occurs in the amount of upward spin angular momentum and downward spin angular moment. Furthermore, when the thickness of the insulating layer 104 is sufficiently thin, the electrons can enter the storage layer 106 before the spin polarization relaxes and becomes a non-polarized state in a normal non-magnetic substance (the number of upward electrons and the number of downward electrons are the same).

In the storage layer 106, a direction of spin polarization is opposite to that of the electrons having entered. Therefore, some of the electrons that have entered are reversed, that is, the direction of the spin angular momentum changes in order to lower the energy of the entire system. At this time, since the spin angular momentum is stored in the entire system, a reaction equivalent to a total change of the spin angular momentum due to the reversed electrons is applied to the magnetic moment (magnetization direction) of the storage layer 106.

In a case where the current, that is, the number of electrons passing in a unit time is small, a total number of electrons that change the direction is also small, and thus, the change of the spin angular momentum generated in the magnetic moment of the storage layer 106 is also small. On the other hand, when the current, that is, the number of electrons passing in the unit time is increased, a desired change of the spin angular momentum can be given to the magnetic moment of the storage layer 106 in the unit time. A temporal change of the spin angular momentum is torque, and when the torque exceeds a predetermined threshold, the magnetic moment of the storage layer 106 starts to be reversed, and becomes stable in a state of being reversed by 180 degrees. Note that the magnetic moment of the storage layer 106 becomes stable in the state of being reversed by 180 degrees since there is an easy magnetization axis in the magnetic substance constituting the storage layer 106, and thus, there is uniaxial anisotropy By the mechanism as described above, the MTJ element 10 changes from the antiparallel state to a parallel state where the directions of the magnetic moments of the fixed layer 102 and the storage layer 106 are the same.

Further, in a case where the current is caused to reversely flow in a direction in which electrons enter from the storage layer 106 to the fixed layer 102 in the parallel state, the electrons reversed by being reflected on the fixed layer 102 when reaching the fixed layer 102 apply torque to the storage layer 106 when entering the storage layer 106. Therefore, the magnetic moment of the storage layer 106 is reversed by the applied torque, and the MTJ element 10 changes from the parallel state to the antiparallel state.

However, a current amount of a reversal current for causing reversal from the parallel state to the antiparallel state is larger than that in the case of reversal from the antiparallel state to the parallel state. Note that, regarding the reversal from the parallel state to the antiparallel state, briefly, the reversal in the fixed layer 102 is difficult because the magnetic moment of the fixed layer 102 is fixed, and the magnetic moment of the storage layer 106 is reversed in order to store the spin angular momentum of the entire system. In this manner, the storage of I/O in the MTJ element 10 is performed by causing a current, equal to or larger than a predetermined threshold corresponding to each polarity, to flow in a direction from the fixed layer 102 toward the storage layer 106 or in its opposite direction. In this manner, I/O is written in the MTJ element 10 by reversing the magnetic moment of the storage layer 106 in the MTJ element 10 and changing a resistance state of the MTJ element 10.

Next, a mechanism for information reading in the MTJ element 10 will be described. In the MTJ element 10, reading of information from the storage layer 106 is performed using the magnetoresistance effect. Specifically, in a case where a current is caused to flow between the lower electrode (not illustrated) and the upper electrode (not illustrated) sandwiching the MTJ element 10, the resistance state of the MTJ element 10 changes on the basis of whether the directions of the magnetic moments of the fixed layer 102 and the storage layer 106 are parallel to each other or antiparallel to each other. Then, information stored in the storage layer 106 can be read by determining the resistance state of the MTJ element 10, that is, a magnitude of the electrical resistance indicated by the MTJ element 10.

1-5. In-Plane Magnetization STT-MRAM and Perpendicular Magnetization STT-MRAM STT-MRAMs include an in-plane magnetization STT-MRAM using a magnetic substance having magnetic anisotropy in the in-plane direction and a perpendicular magnetization STT-MRAM using a magnetic substance having magnetic anisotropy in the perpendicular direction. In general, the perpendicular magnetization STT-MRAM is considered to be more suitable for reduction in power and an increase in capacity than the in-plane magnetization STT-MRAM. This is because the perpendicular magnetization STT-MRAM has a lower energy barrier that needs to be exceeded at the time of spin torque magnetization reversal, and is advantageous in maintaining the thermal stability of a storage carrier in which high magnetic anisotropy of a perpendicular magnetization film is miniaturized for the increase in capacity.

Specifically, when a reversal current of the in-plane magnetization STT-MRAM is Ic_para, the reversal current from the parallel state to the antiparallel state is $$Ic\_para=(A \cdot \alpha \cdot Ms \cdot V/g(0)/P)(Hk+2\pi Ms), \text{ and}$$

the reversal current from the antiparallel state to the parallel state is $$Ic\_para = -\left(A \cdot \alpha \cdot Ms \cdot V/g(\pi)/P\right)(Hk + 2\pi Ms).$$

Further, when a reversal current of the perpendicular magnetization STT-MRAM is Ic_perp, the reversal current from the parallel state to the antiparallel state is $$Ic\_perp=(A \cdot \alpha \cdot Ms \cdot V/g(0)/P)(Hk-4\pi Ms), \text{ and}$$

the reversal current from the antiparallel state to the parallel state is $$Ic\_perp = -\left(A \cdot \alpha \cdot Ms \cdot V / g(\pi)/P\right)(Hk - 4\pi Ms).$$

Note that A is a constant, α is a damping constant, Ms is saturation magnetization, V is an element volume, g(0)P and g(π)P are coefficients corresponding to efficiency at which the spin torque is transmitted to a counterpart magnetic layer in the parallel state and the antiparallel state, respectively, and Hk is magnetic anisotropy (see, for example, S. Mangin et al. Nature materials, vol. 5 Mar. 2006, p. 210).

In each of the above formulas, when (Hk–4πMs) in the case of the perpendicular magnetization type is compared with (Hk+2πMs) in the case of the in-plane magnetization type, it can be understood that the perpendicular magnetization type is more suitable for reducing a storage current. That is, (Hk–4πMs) in the case of the perpendicular magnetization STT-MRAM is smaller than (Hk+2πMs) in the case of the in-plane magnetization STT-MRAM. Therefore, it can be seen that the perpendicular magnetization STT-MRAM is more suitable from the viewpoint of reducing the reversal current at the time of writing since the reversal current is smaller.

1-6. First Operation Example of Storage Device

Figure 4:
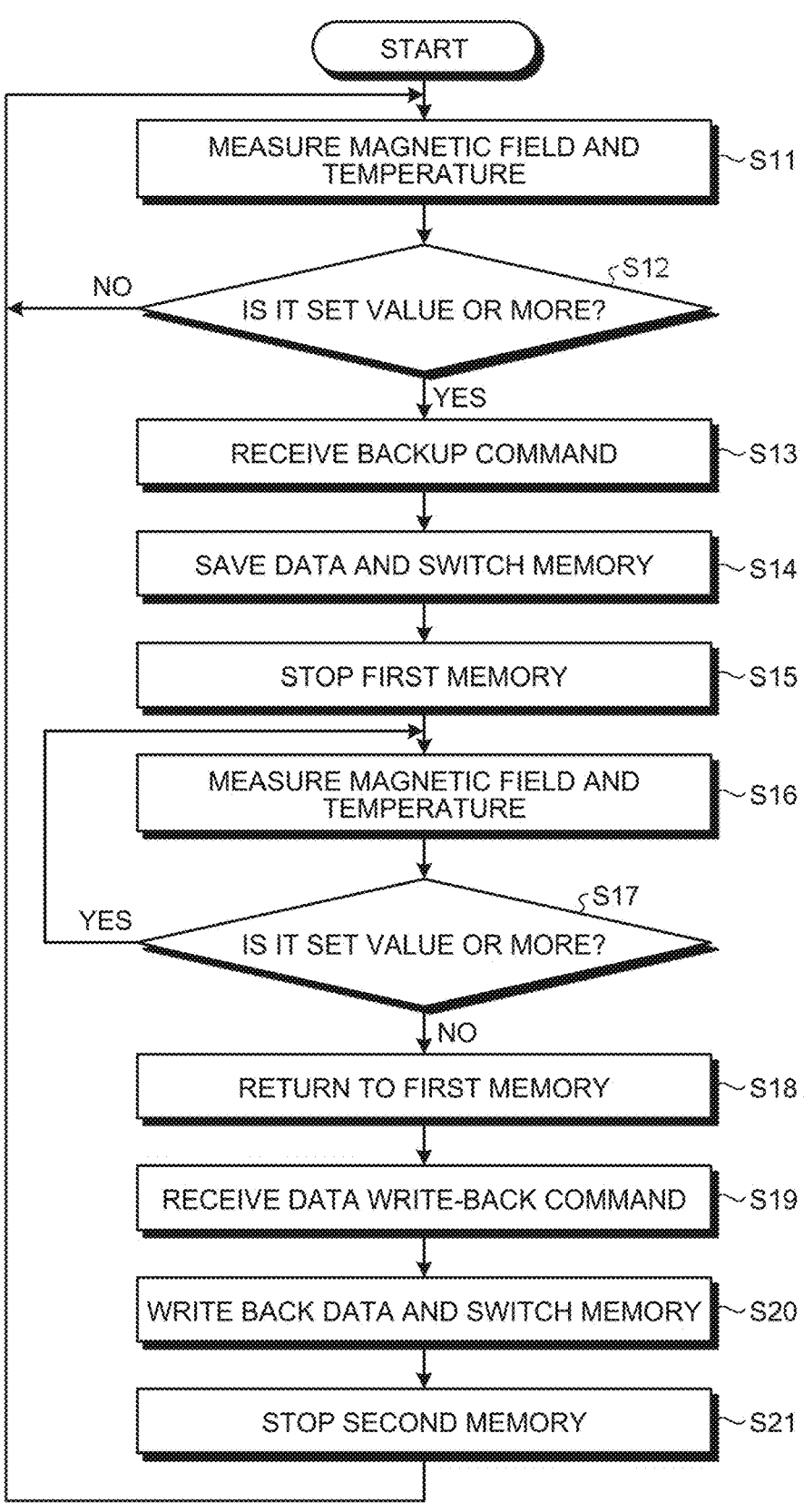
FIG. 4 is a flowchart illustrating an example of first operation processing according to the first embodiment.
Figure 5:
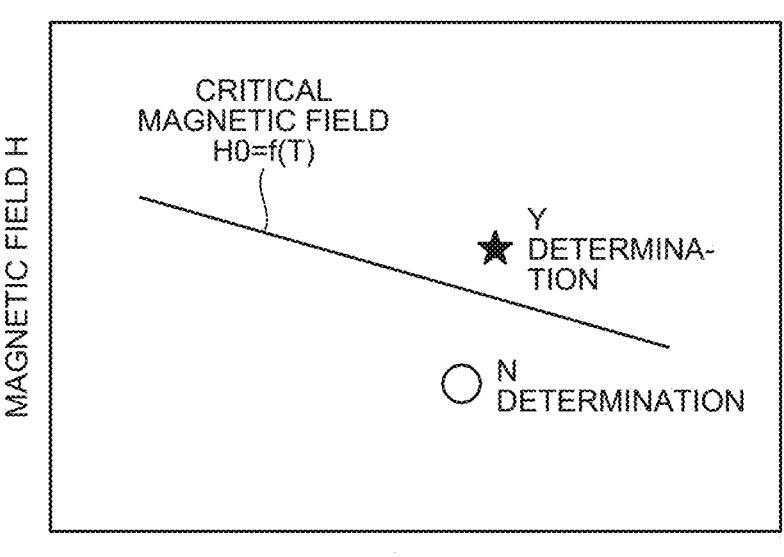
FIG. 5 is a view for describing failure occurrence determination according to the first embodiment.

A first operation example of the storage device 500 according to the first embodiment will be described with reference to FIGS. 4 and 5. FIG. 4 is a flowchart illustrating an example of first operation processing according to the first embodiment. FIG. 5 is a view for describing failure occurrence determination according to the first embodiment.

As illustrated in FIG. 4, in the first operation example, in Step S11, the detection unit 504 detects and measures a magnetic field intensity and an environmental temperature to which the system is exposed at regular time intervals, and sends detection information (measurement information) of the magnetic field intensity and the environmental temperature to the control unit 505. In Step S12, the control unit 505 determines whether or not the magnetic field intensity at the detected temperature is a predetermined set value or more on the basis of the detection information. The magnetic field intensity at the detected temperature is a detection magnetic field intensity at a detection temperature (current temperature).

Here, the predetermined set value is set on the basis of, for example, H0=f(T) as illustrated in FIG. 5. H0 is a critical magnetic field, f is a coefficient, and T is a temperature. Note that FIG. 5 is created on the basis of, for example, a data sheet of the MRAM 1 to be used, and the horizontal axis and the vertical axis in FIG. 5 represent the temperature T and a magnetic field H. A straight line in FIG. 5 indicates a threshold value (threshold) for setting the critical magnetic field in which a failure occurs in operation when the magnetic field intensity is exceeded at a certain temperature, and is expressed as a function of temperature. The control unit 505 determines that there is a possibility of occurrence of a failure in the first memory 501 if the threshold value is exceeded, and determines that the first memory 501 can be continuously used if the threshold value is not exceeded. Note that the straight line in FIG. 5 is schematically illustrated as a straight line for description, and may be a curve in which a change rate changes depending on the temperature.

In Step S12, if the control unit 505 determines that the magnetic field intensity at the detected temperature is not the predetermined set value or more (No in Step S12), the processing returns to Step S11, the first memory 501 is continuously used, and the measurement of the temperature and the magnetic field is continued until the next determination timing. On the other hand, if the control unit 505 determines that the magnetic field intensity at the detected temperature is the predetermined set value or more (Yes in Step S12), there is a high possibility that the operation of the first memory 501 becomes abnormal, and thus, the control unit 505 notifies the system of such a fact and receives a backup command from the system in Step S13. In Step S14, the control unit 505 makes a backup by moving data in the first memory 501 to the second memory 502, and switches a memory (memory in use) referred to by the system from the first memory 501 to the second memory 502 after completion of the movement for the backup. After the switching, the control unit 505 stops the operation of the first memory 501 in Step S15.

In Step S16, the detection unit 504 detects and measures a magnetic field intensity and an environmental temperature to which the system is exposed at regular time intervals, and sends detection information (measurement information) of the magnetic field intensity and the temperature to the control unit 505. In Step S17, the control unit 505 determines whether or not the magnetic field intensity at the detected temperature is a predetermined set value or more on the basis of the detection information. The predetermined set value is the same as the set value in Step S12.

In Step S17, if the control unit 505 determines that the magnetic field intensity at the detected temperature is the predetermined set value or more (Yes in Step S17), the processing returns to Step S16, the second memory 502 is continuously used, and the measurement of the temperature and the magnetic field is continued until the next determination timing. On the other hand, if the control unit 505 determines that the magnetic field intensity at the detected temperature is not the predetermined set value or more due to a change in environment (No in Step S17), there is no possibility that the operation of the first memory 501 causes a failure, and thus, the operation of the first memory 501 is resumed in Step S18. In Step S19, the control unit 505 notifies the system of the return to the first memory 501, and receives a data write-back command from the system. In Step S20, the control unit 505 writes data in the second memory 502 back to the first memory 501, and switches the memory to be referred to by the system from the second memory 502 to the first memory 501. After the switching, in Step S21, the control unit 505 stops the operation of the second memory 502.

Note that the processing returns to the beginning (Step S11) of the flowchart after the system operates with reference to the first memory 501, and the determination of occurrence of the failure based on measured values of the temperature and the magnetic field is continued.

According to such a first operation example, the measurement of the temperature and the magnetic field and the determination of the possibility of the failure are continued, and when it is determined that there is a possibility that the magnetic field intensity causes the failure of the first memory 501 at the current temperature, data is written out from the first memory 501 to the second memory 502 according to an instruction of the control unit 505, the memory referred to by the system is switched from the first memory 501 to the second memory 502, and the operation of the first memory 501 is stopped. As a result, the operation of the first memory 501 is limited, but the operation of the system is continued by the operation of the second memory 502. Thereafter, when it is determined that there is a possibility of the failure in the first memory 501, the first memory 501 is not resumed, and the measurement of the temperature and the magnetic field and the determination of the possibility of the failure are continued.

On the other hand, when it is determined that there is no possibility that the magnetic field intensity causes the failure in the first memory 501 at the current temperature due to the change in environment, the operation of the first memory 501 is resumed according to an instruction of the control unit 505, data is written back from the second memory 502 to the first memory 501, the memory referred to by the system is switched from the second memory 502 to the first memory 501, and the operation of the second memory 502 is stopped. As a result, the operation of the second memory 502 is limited, but the operation of the system is continued by the operation of the first memory 501.

Note that the basic operation is to use the MRAM as the first memory 501 when an influence of the external magnetic field is sufficiently small in the first operation example, for example. This is to take advantage of the MRAM in terms of power saving, the number of times of rewriting, an operation speed, and the like, and it is desirable to use another memory other than the MRAM only when there is a concern about the influence of the magnetic field.

1-7. Second Operation Example of Storage Device

Figure 6:
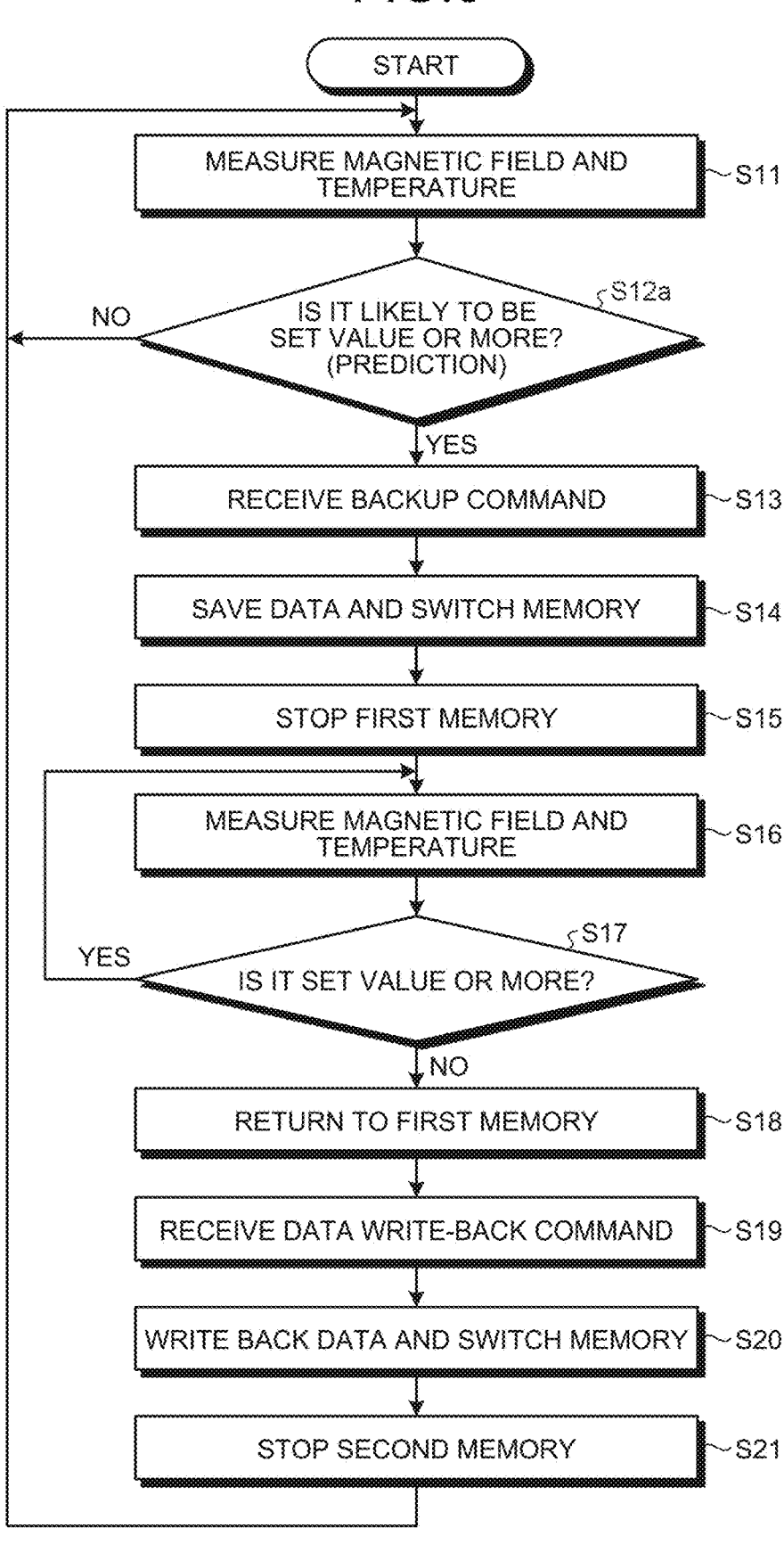
FIG. 6 is a flowchart illustrating an example of second operation processing according to the first embodiment.
Figure 7:
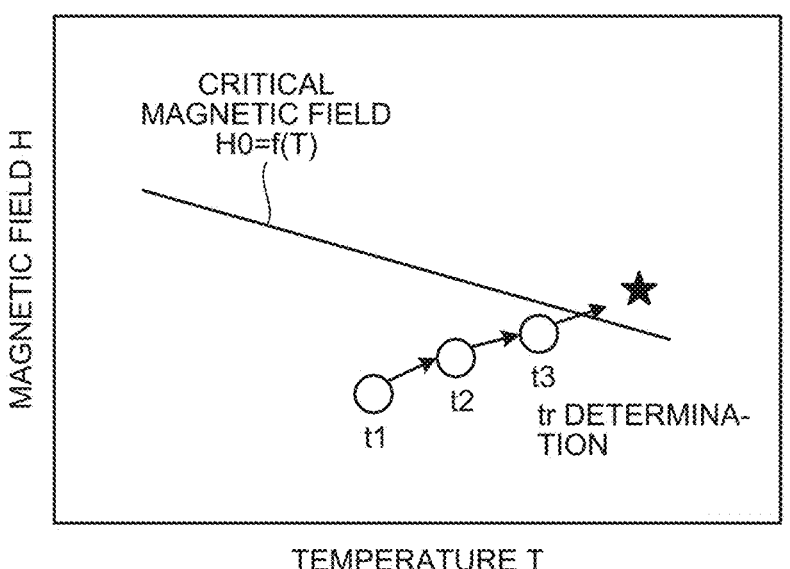
FIG. 7 is a view for describing failure occurrence prediction according to the first embodiment.

A second operation example of the storage device 500 according to the first embodiment will be described with reference to FIGS. 6 and 7. FIG. 6 is a flowchart illustrating an example of second operation processing according to the first embodiment. FIG. 7 is a view for describing failure occurrence prediction according to the first embodiment.

As illustrated in FIG. 6, the second operation example is basically the same as the first operation example, but in the second operation example, the control unit 505 determines whether or not a magnetic field intensity at a detected temperature is likely to be a set value or more on the basis of changes (for example, change rates) in the detected temperature and the magnetic field intensity in Step S12*a* instead of whether or not the magnetic field intensity at the detected temperature is the set value or more (see Step S12 in FIG. 4).

That is, the control unit 505 continues the measurement of the temperature and the magnetic field intensity, and predicts variations in the possibility of occurrence of a failure in the first memory 501. As an example, the control unit 505 predicts changes in temperature and magnetic field intensity on the basis of pieces of data at a plurality of times t1, t2, and t3, for example, as illustrated in FIG. 7, and determines whether or not the magnetic field intensity at the detected temperature exceeds the critical magnetic field H0=f(T) after a certain time tr.

In a case where the possibility of occurrence of the failure in the first memory 501 is low according to such prediction, the first memory 501 is continuously used, and the measurement of the temperature and the magnetic field and the prediction of the changes are continued until the next determination timing. On the other hand, in a case where there is a possibility of occurrence of the failure in the first memory 501 after the time tr according to the prediction, the processing proceeds to the next procedure (Step S13 and subsequent steps in FIG. 6). That is, since there is a high possibility that the operation of the first memory 501 becomes abnormal, the control unit 505 makes a backup by moving data of the first memory 501 to the second memory 502 in Step S14, switches a memory to be referred to by the system from the first memory 501 to the second memory 502 after completion of the movement for the backup, and stops the operation of the first memory 501 in Step S15 after the switching.

Here, a time required from data saving of the first memory 501 to the switching of the memory referred to by the system (or the stopping of the operation of the first memory 501) depends on the amount of data, but can be defined as ta in advance, for example. This time ta is set to be shorter than the time tr required from a predicted time point to the occurrence of the failure in the first memory 501.

According to such a second operation example, there is an advantage that the accuracy of the determination of the magnetic field intensity causing the failure of the system can be improved as compared with the first operation example. That is, in the first operation example, the data saving is started at a time point when the magnetic field intensity at the detected temperature becomes the predetermined set value or more, and thus, it is necessary to set the set value with a margin in the magnetic field lower than an actual magnetic field allowed as a characteristic of the first memory 501 (for example, the MRAM) in consideration of the time until completion of the data saving. On the other hand, according to the second operation example, the actual magnetic field allowed in the first memory 501 is directly used as the set value and used as the basis for the prediction as to whether or not the magnetic field is likely to exceed the set value within the time for which the saving is possible, and thus, the memory referred to by the system is not unnecessarily switched from the first memory 501 to the second memory 502.

Note that the basic operation is to use the MRAM as the first memory 501 when an influence of the external magnetic field is sufficiently small also in the second operation example, for example. This is to take advantage of the MRAM in terms of power saving, the number of times of rewriting, an operation speed, and the like, and it is desirable to use another memory other than the MRAM only when there is a concern about the influence of the magnetic field. (Modification)

Here, a modification of the second operation example will be described. This modification is basically the same as the second operation example, but in the modification, the control unit 505 determines whether or not a magnetic field intensity at a detected temperature is likely to be a set value or more on the basis of changes (for example, change rates) in the detected temperature and the magnetic field intensity in Step S17 as in Step S12*a*.

That is, whether or not to return is determined on the basis of whether or not the magnetic field intensity at the detected temperature has fallen below the set value in Step S17 in the second operation example, but in the modification, whether or not to return is determined on the basis of prediction as to whether or not the magnetic field intensity at the detected temperature is likely to fall below the set value after a certain time also in Step S17. According to the modification, as compared with the second operation example, the actual magnetic field allowed in the first memory 501 can be directly used as the set value also in the determination of the return to the first memory 501, and a period of using the first memory 501 can be extended.

Here, the failure occurrence prediction can be used in Step S12*a* and Step S17 as in the second operation example and the modification, and the failure occurrence prediction may be used only in Step S17 without being used in Step S12a and can be used in one or both of Step S12a and Step S17.

According to the first operation example, the second operation example, or the modification as described above, when the external magnetic field that affects the first memory 501 is generated, the magnetic field intensity thereof is detected, data is quickly saved from the first memory 501 to the second memory 502, and the operation of the system is continued using the second memory 502 in which the data is saved, so that it is possible to significantly reduce the probability of occurrence of a failure in the system caused by the magnetic field.

Note that the first operation example, the second operation example, or the modification can be applied not only to the MRAM such as the STT-MRAM but also to a device having a magnetic substance as a storage layer, that is, any type of MRAM such as a magnetic field writing type, a toggle type, a voltage inversion type, and a spin orbit torque type.

Further, the magnetic field intensity and the temperature are detected, and data is saved from the first memory 501 to the second memory 502 according to the magnetic field intensity and the temperature in the first operation example, the second operation example, or the modification. However, in an environment where a temperature change is small, only the magnetic field intensity may be detected without detecting the temperature, and data may be saved from the first memory 501 to the second memory 502 according to the magnetic field intensity.

1-8. Action and Effect

As described above, according to the first embodiment, the storage device 500 includes the first memory 501 that allows reading and writing of data, the second memory 502 that allows reading and writing of data, the detection unit 504 that detects a magnetic field intensity in the periphery of the first memory 501, and the control unit 505 that saves data from the first memory 501 to the second memory 502 and switches the memory in use from the first memory 501 to the second memory 502 depending on the magnetic field intensity detected by the detection unit 504. As a result, in a case where an external magnetic field that affects the first memory 501 is generated, the magnetic field intensity is detected, the data is saved from the first memory 501 to the second memory 502, and the operation of the system can be continued using the second memory 502 in which the data is saved, so that a system failure caused by a memory error derived from the external magnetic field can be avoided.

Further, the detection unit 504 may detect a temperature in the periphery of the first memory 501 in addition to the magnetic field intensity, and the control unit 505 may save the data from the first memory 501 to the second memory 502 and switch the memory in use from the first memory 501 to the second memory 502 according to the magnetic field intensity and the temperature detected by the detection unit 504. As a result, it is possible to reliably avoid the system failure caused by the memory error derived from the external magnetic field.

Further, the control unit 505 may save the data from the first memory 501 to the second memory 502 and switch the memory in use from the first memory 501 to the second memory 502 in a case where the magnetic field intensity at the temperature detected by the detection unit 504 is a predetermined set value or more (in a case where the detected magnetic field intensity is the predetermined set value or more at a current temperature). As a result, it is possible to reliably avoid the system failure caused by the memory error derived from the external magnetic field.

Further, the control unit 505 may move the data from the second memory 502 to the first memory 501 and switch the memory in use from the second memory 502 to the first memory 501 when the magnetic field intensity at the temperature detected by the detection unit 504 becomes less than the predetermined set value in a state where the second memory 502 is the memory in use. As a result, it is possible to reliably avoid the system failure caused by the memory error derived from the external magnetic field.

Further, the control unit 505 may save the data from the first memory 501 to the second memory 502 and switch the memory in use from the first memory 501 to the second memory 502 when predicting that the magnetic field intensity at the temperature detected by the detection unit 504 is going to be a predetermined set value or more on the basis of changes in the magnetic field intensity and the temperature detected by the detection unit 504. As a result, it is possible to reliably avoid the system failure caused by the memory error derived from the external magnetic field.

Further, the control unit 505 may move the data from the second memory 502 to the first memory 501 and switch the memory in use from the second memory 502 to the first memory 501 when predicting that the magnetic field intensity at the temperature detected by the detection unit 504 is not going to be the predetermined set value or more on the basis of the changes in the magnetic field intensity and the temperature detected by the detection unit 504 in the state where the second memory 502 is the memory in use. As a result, it is possible to reliably avoid the system failure caused by the memory error derived from the external magnetic field.

Further, a time required for saving the data from the first memory 501 to the second memory 502 and switching the memory in use from the first memory 501 to the second memory 502 may be set to be shorter than a time required until the magnetic field intensity at the temperature detected by the detection unit 504 becomes the predetermined set value or more since a time point when it is predicted that the magnetic field intensity at the temperature detected by the detection unit 504 is going to be the predetermined set value or more. As a result, it is possible to reliably avoid the system failure caused by the memory error derived from the external magnetic field.

Further, the detection unit 504 may include the magnetic field sensor 504a that detects the magnetic field intensity and the temperature sensor 504b that detects the temperature. As a result, both the magnetic field intensity and the temperature can be detected.

Further, the first memory 501 may be an MRAM, a magnetic field writing MRAM, an STT-MRAM, an SOT-MRAM, or a VC-MRAM. As a result, it is possible to achieve the system that does not use more power than necessary by utilizing the non-volatility of the MRAM.

Further, the second memory 502 may be a memory having higher magnetic field resistance than the first memory 501. As a result, it is possible to reliably avoid the system failure caused by the memory error derived from the external magnetic field.

Further, the second memory 502 may be a memory having higher temperature resistance than the first memory 501. As a result, it is possible to reliably avoid the system failure caused by the memory error derived from the external magnetic field.

Further, the second memory 502 may be a memory that is not affected by the magnetic field. As a result, it is possible to reliably avoid the system failure caused by the memory error derived from the external magnetic field.

The second memory 502 may be an SRAM, an eDRAM, an eFlash memory, a FeRAM, a ReRAM, or a PCM. As a result, it is possible to reliably avoid the system failure caused by the memory error derived from the external magnetic field.

2. Second Embodiment

2-1. Configuration Example of Storage Device

Figure 8:
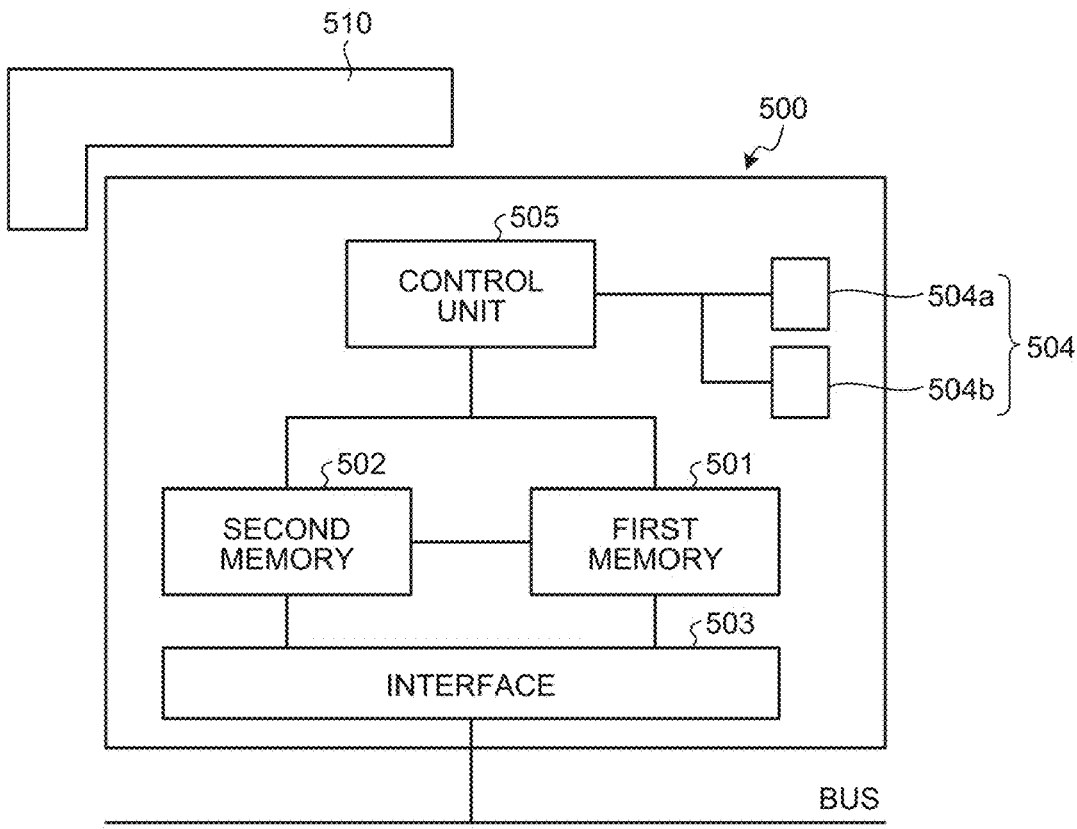
FIG. 8 is a diagram illustrating an example of a schematic configuration of a storage device according to a second embodiment.

A configuration example of the storage device 500 according to a second embodiment will be described with reference to FIG. 8. FIG. 8 is a diagram illustrating an example of a schematic configuration of the storage device 500 according to the second embodiment.

As illustrated in FIG. 8, the storage device 500 according to the second embodiment includes a magnetic shield member 510 in addition to the first memory 501, the second memory 502, the interface 503, the detection unit 504, and the control unit (controller) 505 according to the first embodiment. The magnetic shield member 510 is provided to suppress a magnetic field with respect to the first memory 501 and the second memory 502, for example, so as to cover the first memory 501 and the second memory 502. As the magnetic shield member 510, for example, metal such as an alloy can be used.

Note that the magnetic shield member 510 may be provided to suppress the magnetic field with respect to at least the first memory 501. As the second memory 502, a memory (for example, an SRAM or the like) that is not affected by the magnetic field can be used. However, a memory having higher magnetic field resistance than the first memory 501 may also be used as the second memory 502. In this case, it is desirable to suppress the magnetic field with respect to the first memory 501 and the second memory 502.

2-2. Action and Effect

As described above, the effect according to the first embodiment can be obtained according to the second embodiment. That is, according to the second embodiment, it is possible to further reduce the probability of occurrence of a system failure by providing the magnetic shield member 511 that suppresses the magnetic field with respect to the first memory 501, and thus, it is possible to reliably avoid the system failure caused by a memory error derived from an external magnetic field.

Further, the magnetic shield member 511 may suppress the magnetic field with respect to the second memory 502 in addition to the first memory 501. As a result, it is possible to more reliably avoid the system failure caused by the memory error derived from the external magnetic field.

3. Other Embodiments

The configurations according to the above embodiments may be implemented in various different forms other than the above embodiments. For example, the configurations are not limited to the above-described examples, and may have various modes. Further, for example, the configurations, processing procedures, specific names, and information including various types of data and parameters illustrated in the above document and drawings can be arbitrarily changed unless otherwise specified.

Further, each component of each device illustrated is a functional concept, and does not necessarily need to be physically configured as illustrated. That is, the specific form of distribution/integration of each device is not limited to those illustrated in the drawings, and all or a part thereof may be functionally or physically distributed/integrated into arbitrary units according to various loads and usage situations.

For example, each of the MTJ elements 10 according to each of the above embodiments (including each modification) may be used as a magnetoresistive element, and a storage device such as a hard disk drive (HDD) may be configured as the storage device 500.

Further, although the magnetic field sensor 504*a* and the temperature sensor 504*b* are used as the detection unit 504, for example, a strain sensor may be used without being limited thereto. In this case, it is possible to grasp a critical magnetic field not from a relationship between the magnetic field and the temperature but from a relationship between the magnetic field and a strain, and to set a predetermined setting in advance.

Further, the detection unit 504 is provided for the first memory 501, but is not limited thereto. For example, in a case where a memory that is affected by a magnetic field to some extent is used as the second memory 502, a detection unit that detects one or both of a magnetic field intensity and a temperature in the periphery of the second memory 502 may be provided, and processing (see, for example, FIGS. 4 to 7) related to failure occurrence determination and prediction regarding an influence of the magnetic field on the second memory 502 may be performed.

Further, although the first memory 501 and the second memory 502 are used as the memory in use, for example, three or more memories may be used without being limited thereto. In this case, one memory or a plurality of memories may be used as a memory for data saving.

4. Application Example

4-1. Imaging Device

Figure 9:
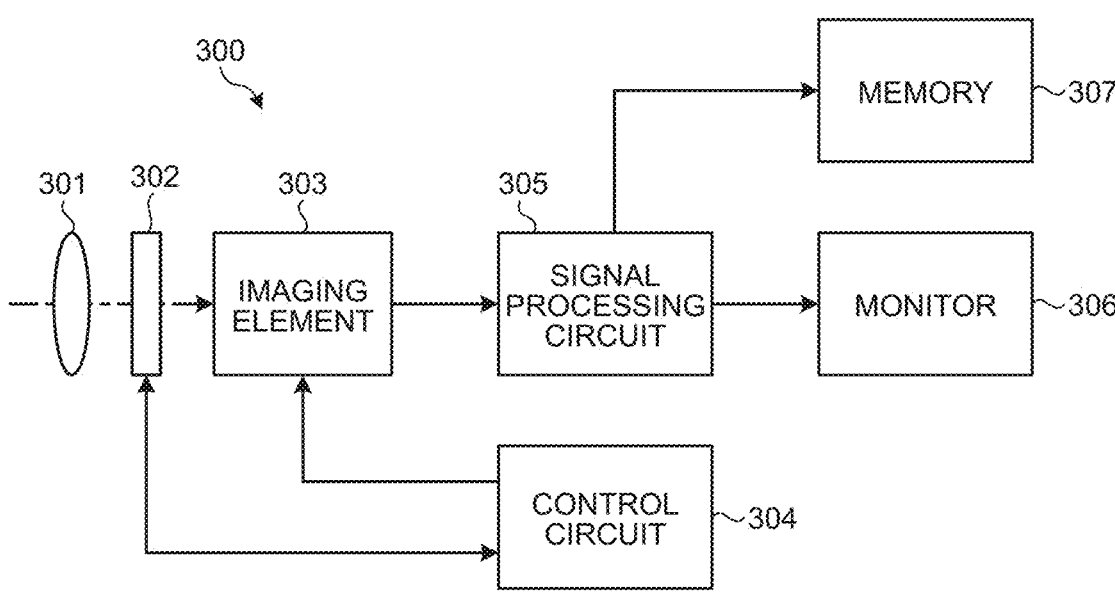
FIG. 9 is a diagram illustrating an example of a schematic configuration of an imaging device.

As an electronic apparatus including the storage device 500 according to each of the above embodiments (also including the modification), an imaging device 300 will be described with reference to FIG. 9. FIG. 9 is a diagram illustrating an example of a schematic configuration of the imaging device 300 including the storage device 500 according to any one of the above embodiments.

The imaging device 300 uses the storage device 500 according to each of the above embodiments as a memory. Examples of the imaging device 300 include electronic apparatuses such as a digital still camera, a video camera, a smartphone and a mobile phone which have an imaging function, and the like. Further, examples of the memory include a flash memory and the like.

As illustrated in FIG. 9, the imaging device 300 includes an optical system 301, a shutter device 302, an imaging element 303, a control circuit (drive circuit) 304, a signal processing circuit 305, a monitor 306, and a memory 307. The imaging device 300 can capture a still image and a moving image.

The optical system 301 includes one or a plurality of lenses. The optical system 301 guides light (incident light) from a subject to the imaging element 303 and forms an image on a light receiving surface of the imaging element 303.

The shutter device 302 is disposed between the optical system 301 and the imaging element 303. The shutter device 302 controls a light irradiation period and a light shielding period with respect to the imaging element 303 according to the control of the control circuit 304.

The imaging element 303 accumulates signal charges for a certain period according to light formed on the light receiving surface via the optical system 301 and the shutter device 302. The signal charges accumulated in the imaging element 303 is transferred in accordance with a drive signal (timing signal) supplied from the control circuit 304.

The control circuit 304 outputs the drive signal for controlling a transfer operation of the imaging element 303 and a shutter operation of the shutter device 302 to drive the imaging element 303 and the shutter device 302.

The signal processing circuit 305 performs various types of signal processing on the signal charges output from the imaging element 303. An image (image data) obtained by performing the signal processing by the signal processing circuit 305 is supplied to the monitor 306 and also supplied to the memory 307.

The monitor 306 displays a moving image or a still image captured by the imaging element 303 based on the image data supplied from the signal processing circuit 305. As the monitor 306, for example, a panel type display device such as a liquid crystal panel or an organic electro luminescence (EL) panel is used.

The memory 307 stores the image data supplied from the signal processing circuit 305, that is, image data of the moving image or the still image captured by the imaging element 303. The memory 307 includes the storage device 500 according to any one of the above-described embodiments.

Even in the imaging device 300 configured as described above, improvement in productivity can be realized by using the storage device 500 described above as the memory 307.

Furthermore, the storage device 500 according to each of the above-described embodiments can be mounted on various electronic devices on which a memory (storage unit) can be mounted as described above. For example, the storage device 500 may be mounted on various electronic devices such as the game device, a notebook personal computer (PC), a mobile device (for example, a smartphone, a tablet PC, or the like), a personal digital assistant (PDA), a wearable device, and a music device in addition to the imaging device 300. For example, the storage device 500 is used as various memories such as a storage.

4-2. Exploration Robot

Figure 10:
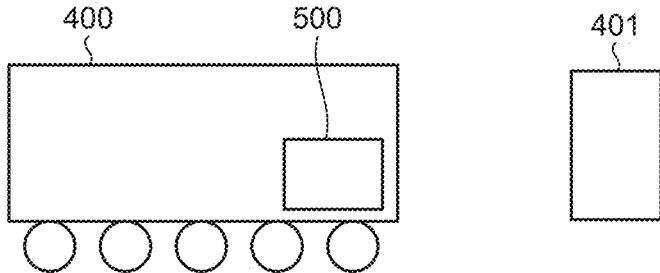
FIG. 10 is a diagram illustrating an example of a schematic configuration of an exploration robot.

As a device including the storage device 500 according to each of the above embodiments (also including the modification), an exploration robot 400 in space or an asteroid will be described with reference to FIG. 10. FIG. 10 is a diagram illustrating an example of a schematic configuration of the exploration robot 400.

As illustrated in FIG. 10, the storage device 500 is mounted on the exploration robot 400 in space or an asteroid. In the example of FIG. 10, there is an object to be explored 401, but there is a possibility that the object to be explored 401 is a magnetic field generation source. The storage device 500 has high resistance to space radiation unlike other memories having electric charge as a unit of storage, and thus, is suitable for use in the space or asteroid. Since there is a possibility that supply of power is not sufficient in the space or asteroid, for example, a system that uses an MRAM as the first memory 501 and does not use more power than necessary by utilizing the non-volatility of the MRAM is used. This is because an SRAM requires power for data retention, and a non-volatile memory other than the MRAM requires a high-voltage writing operation or has a limit in the number of rewritable times.

In a case where the system including the MRAM is used in the exploration robot 400, the storage device 500 according to each of the embodiments is employed. Due to the purpose of exploration, it is inherently difficult to predict an environmental change in the space or asteroid, and regarding a magnetic field, there is a possibility of approaching a strong magnetic field source, for example, magnetite or the like magnetic field. Thus, when a system of a conventional example is used, there is a concern that problems such as an operation stop and runaway may occur due to an influence of the magnetic field. Therefore, when the storage device 500 according to each of the embodiments is used, it is possible to avoid a system failure due to the influence of the magnetic field while taking advantage of the resistance to the radiation, low power, and the like.

4-3. Investigation Robot

Figure 11:
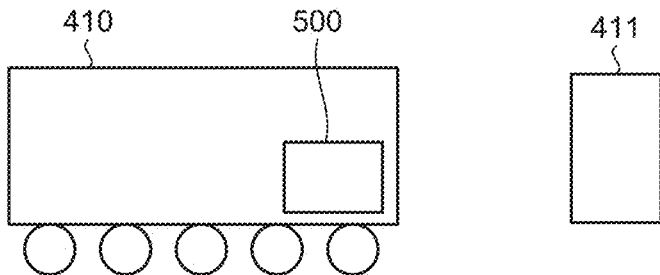
FIG. 11 is a diagram illustrating an example of a schematic configuration of an investigation robot.

As a device including the storage device 500 according to each of the above embodiments (including each modification), an investigation robot (search robot) 410 for disaster and accident sites will be described with reference to FIG. 11. FIG. 11 is a diagram illustrating an example of a schematic configuration of the investigation robot 410.

As illustrated in FIG. 11, the storage device 500 is mounted on the investigation robot 410 for disaster and accident sites. In the example of FIG. 11, there is an object to be investigated (object to be searched) 411, but there is a possibility that the object to be investigated 411 is a magnetic field generation source. For example, an advantage of using an MRAM as the first memory 501 is reduction in power consumption for autonomous operation. Similarly to the above-described planetary exploration, it is effective to use the storage device 500 according to each of the embodiments in a case where it is difficult to foresee a situation in advance and there is a possibility of generating a magnetic field. When a system of a conventional example is used, there is a concern that problems such as an operation stop and runaway may occur due to an influence of the magnetic field, but these problems can be avoided by using the storage device 500 according to each of the embodiments.

4-4. Automobile

Figure 12:
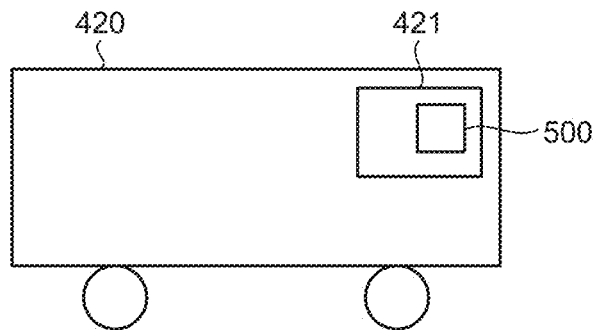
FIG. 12 is a diagram illustrating an example of a schematic configuration of an automobile.

As a device including the storage device 500 according to each of the above embodiments (including each modification), an automobile 420 will be described with reference to FIG. 12. FIG. 12 is a diagram illustrating an example of a schematic configuration of the automobile 420.

As illustrated in FIG. 12, the storage device 500 is mounted on a drive recorder 421 provided in the automobile 420. A large number of magnets such as a motor are mounted on the automobile 420, and there is no problem during normal use, but there is a possibility that a vehicle body is deformed when an accident occurs so that the drive recorder 421 and the magnets come close to each other. Thus, when a system of a conventional example is used, there is a risk that it is difficult to acquire necessary data due to an influence of a magnetic field, but such problems can be avoided by using the storage device 500 according to each of the embodiments.

5. Appendix

Note that the present technology can also have the following configurations.

(1)

A storage device comprising:

a first memory that allows reading and writing of data;

a second memory that allows reading and writing of data;

a detection unit that detects a magnetic field intensity in a periphery of the first memory; and a control unit that saves data from the first memory to the second memory and switches a memory in use from the first memory to the second memory depending on the magnetic field intensity detected by the detection unit.

(2)

The storage device according to (1), wherein the detection unit detects a temperature in the periphery of the first memory in addition to the magnetic field intensity, and the control unit saves the data from the first memory to the second memory and switches the memory in use from the first memory to the second memory depending on the magnetic field intensity and the temperature detected by the detection unit.

(3)

The storage device according to (2), wherein the control unit saves the data from the first memory to the second memory and switches the memory in use from the first memory to the second memory in a case where the magnetic field intensity at the temperature detected by the detection unit is a predetermined set value or more.

(4)

The storage device according to (3), wherein the control unit moves the data from the second memory to the first memory and switches the memory in use from the second memory to the first memory when the magnetic field intensity at the temperature detected by the detection unit becomes less than the predetermined set value in a state where the second memory is the memory in use.

(5)

The storage device according to (2), wherein the control unit saves the data from the first memory to the second memory and switches the memory in use from the first memory to the second memory when predicting that the magnetic field intensity at the temperature detected by the detection unit is going to be a predetermined set value or more based on changes in the magnetic field intensity and the temperature detected by the detection unit.

(6)

The storage device according to (5), wherein the control unit moves the data from the second memory to the first memory and switches the memory in use from the second memory to the first memory when predicting that the magnetic field intensity at the temperature detected by the detection unit is not going to be the predetermined set value or more based on changes in the magnetic field intensity and the temperature detected by the detection unit in a state where the second memory is the memory in use.

(7)

The storage device according to (5) or (6), wherein a time required for saving the data from the first memory to the second memory and switching the memory in use from the first memory to the second memory is set to be shorter than a time required until the magnetic field intensity at the temperature detected by the detection unit becomes the predetermined set value or more since a time point when it is predicted that the magnetic field intensity at the temperature detected by the detection unit is going to be the predetermined set value or more.

(8)

The storage device according to any one of (2) to (7), wherein the detection unit includes:

a magnetic field sensor that detects the magnetic field intensity; and a temperature sensor that detects the temperature.

(9)

The storage device according to any one of (1) to (8), wherein the first memory is an MRAM, a magnetic field writing MRAM, an STT-MRAM, an SOT-MRAM, or a VC-MRAM.

(10)

The storage device according to any one of (1) to (9), wherein the second memory is a memory having higher magnetic field resistance than the first memory.

(11)

The storage device according to any one of (1) to (10), wherein the second memory is a memory having higher temperature resistance than the first memory.

(12)

The storage device according to any one of (1) to (11), wherein the second memory is a memory that is not affected by a magnetic field.

(13)

The storage device according to any one of (1) to (8), wherein the second memory is an SRAM, an eDRAM, an eFlash memory, a FeRAM, a ReRAM, or a PCM.

(14)

The storage device according to any one of (1) to (13), further comprising a magnetic shield member that suppresses a magnetic field with respect to the first memory.

(15)

The storage device according to (14), wherein the magnetic shield member also suppresses a magnetic field with respect to the second memory.

(16)

An electronic apparatus comprising a storage device that stores data, wherein the storage device includes:

a first memory that allows reading and writing of data;

a second memory that allows reading and writing of data;

a detection unit that detects a magnetic field intensity in a periphery of the first memory; and a control unit that saves data from the first memory to the second memory and switches a memory in use from the first memory to the second memory depending on the magnetic field intensity detected by the detection unit.

(17)

A method for controlling a storage device, the method comprising:

detecting a magnetic field intensity in a periphery of a first memory that allows reading and writing of data; and saving data from the first memory to a second memory that allows reading and writing of data and switching a memory in use from the first memory to the second memory depending on the detected magnetic field intensity.

(18)

An electronic apparatus including the storage device according to any one of (1) to (15).

(19)

A storage device control method for controlling the storage device according to any one of (1) to (15).

REFERENCE SIGNS LIST

1 MRAM
10 MTJ ELEMENT
20 SELECTION TRANSISTOR
70 BIT LINE
72 GATE ELECTRODE
74 WIRING
100 BASE LAYER
102 FIXED LAYER
104 INSULATING LAYER
106 STORAGE LAYER
108 CAP LAYER
200 SEMICONDUCTOR SUBSTRATE
202 SOURCE REGION
204 DRAIN REGION
206 ELEMENT ISOLATION LAYER
208 CONTACT LAYER
210 CONTACT LAYER
500 STORAGE DEVICE
501 FIRST MEMORY
502 SECOND MEMORY
503 INTERFACE
504 DETECTION UNIT
504a MAGNETIC FIELD SENSOR
504b TEMPERATURE SENSOR
510 MAGNETIC SHIELD MEMBER

The invention claimed is:

1. A storage device, comprising:
a first memory configured to:
  store data; and
  enable a reading operation and a writing operation of the data;
a second memory configured to:
  store the data; and
  enable the reading operation and the writing operation of the data;
a detection unit configured to detect each of a magnetic field intensity and a temperature in a periphery of the first memory; and
a control unit configured to:
  save the data from the first memory to the second memory based on the detected magnetic field intensity and the detected temperature; and
  switch a memory in use from the first memory to the second memory based on the detected magnetic field intensity and the detected temperature.

2. The storage device according to claim 1, wherein the control unit is further configured to:
  save the data from the first memory to the second memory in a case where the detected magnetic field intensity at the detected temperature is one of equal to or more than a threshold value; and
  switch the memory in use from the first memory to the second memory in the case where the detected magnetic field intensity at the detected temperature is one of equal to or more than the threshold value.

3. The storage device according to claim 2, wherein in a state where the memory in use is the second memory, the control unit is further configured to:
  move the data from the second memory to the first memory in a case where the detected magnetic field intensity at the detected temperature is less than the threshold value; and
  switch the memory in use from the second memory to the first memory in the case where the detected magnetic field intensity at the detected temperature is less than the threshold value.

4. The storage device according to claim 1, wherein the control unit is further configured to:
  predict that the detected magnetic field intensity at the detected temperature is one of equal to or more than a threshold value,
    wherein the detected magnetic field intensity is predicted as one of equal to or more than the threshold value, based on a change in each of the detected magnetic field intensity and the detected temperature;
  save the data from the first memory to the second memory based on the prediction; and
  switch the memory in use from the first memory to the second memory based on the prediction.

5. The storage device according to claim 4, wherein the control unit is further configured to:
  predict that the detected magnetic field intensity at the detected temperature is less than the threshold value,
    wherein the detected magnetic field intensity is predicted as less than the threshold value, based on a change in each of the detected magnetic field intensity and the detected temperature in a state where the memory in use is the second memory;
  move the data from the second memory to the first memory based on the prediction that the detected magnetic field intensity at the detected temperature is less than the threshold value; and
  switch the memory in use from the second memory to the first memory based on the prediction that the detected magnetic field intensity at the detected temperature is less than the threshold.

6. The storage device according to claim 4, wherein the control unit is further configured to:
  predict that the detected magnetic field intensity at the detected temperature is one of equal to or more than the threshold value at a time point,
  a first time duration is shorter than a second time duration,
  the first time duration corresponds to a duration required to save the data from the first memory to the second memory and switch the memory in use from the first memory to the second memory, and
  the second time duration corresponds to a duration required until the detected magnetic field intensity at the detected temperature becomes one of equal to or more than the threshold value since the time point.

7. The storage device according to claim 1, wherein the detection unit includes:
  a magnetic field sensor configured to detect the magnetic field intensity; and
  a temperature sensor configured to detect the temperature.

8. The storage device according to claim 1, wherein the first memory is one of a magnetic random access memory (MRAM), a magnetic field writing MRAM, a spin transfer torque-magnetic random access memory (STT-MRAM), a spin orbit torque-magnetic random access memory (SOT-MRAM), or a voltage controlled-magnetic random access memory (VC-MRAM).

9. The storage device according to claim 1, wherein the second memory has higher magnetic field resistance than the first memory.

10. The storage device according to claim 1, wherein the second memory has higher magnetic temperature resistance than the first memory.

11. The storage device according to claim 1, wherein the second memory is unaffected by a magnetic field.

12. The storage device according to claim 1, wherein the second memory is one of a static random access memory (SRAM), an embedded dynamic random access memory (eDRAM), an embedded flash (eFlash) memory, a ferroelectric random access memory (FeRAM), a resistive random access memory (ReRAM), or a phase change memory (PCM).

13. The storage device according to claim 1, further comprising a magnetic shield member configured to suppress a magnetic field with respect to the first memory.

14. The storage device according to claim 13, wherein the magnetic shield member is further configured to suppress the magnetic field with respect to the second memory.

15. An electronic apparatus, comprising:

a storage device configured to store data, wherein the storage device includes:

a first memory configured to enable a reading operation and a writing operation of the data;

a second memory configured to enable the reading operation and the writing operation of the data;

a detection unit configured to detect each of a magnetic field intensity and a temperature in a periphery of the first memory; and a control unit configured to:

save the data from the first memory to the second memory based on the detected magnetic field intensity and the detected temperature; and switch a memory in use from the first memory to the second memory based on the detected magnetic field intensity and the detected temperature.

16. A method for controlling a storage device, the method comprising:

detecting each of a magnetic field intensity and a temperature in a periphery of a first memory, wherein the first memory enables a reading operation and a writing operation of data;

saving the data from the first memory to a second memory based on the detected magnetic field intensity and the detected temperature, wherein the second memory enables the reading operation and the writing operation of the data; and switching a memory in use form the first memory to the second memory based on the detected magnetic field intensity and the detected temperature.

\* \* \* \* \*